United States Patent [19]

Kumaki

[11] Patent Number: 5,619,229
[45] Date of Patent: Apr. 8, 1997

[54] DISPLAY APPARATUS WITH COLOR TEMPERATURE CONTROL

[75] Inventor: Shingo Kumaki, Osaka, Japan

[73] Assignee: NEC Corporation, Tokyo, Japan

[21] Appl. No.: 237,241

[22] Filed: May 2, 1994

Related U.S. Application Data

[63] Continuation of Ser. No. 779,328, Oct. 15, 1991, abandoned.

[30] Foreign Application Priority Data

Oct. 15, 1990 [JP] Japan ................................. 2-275714

[51] Int. Cl.$^6$ .................................................. G09G 5/02
[52] U.S. Cl. ................................... 345/150; 348/673
[58] Field of Search ................................. 340/701, 703, 340/704; 358/10, 27, 29, 168, 169, 166; 345/22, 150, 153, 186, 12, 77; 348/679, 673, 645, 655; H04N 3/14

[56] References Cited

U.S. PATENT DOCUMENTS

| | | | |
|---|---|---|---|
| 3,873,767 | 3/1975 | Okada et al. | 348/673 |
| 4,347,528 | 8/1982 | Johnson et al. | 358/10 |
| 4,547,797 | 10/1985 | Mick | 358/27 |
| 4,694,330 | 9/1987 | Tanaka et al. | 348/652 |
| 4,700,218 | 10/1987 | Thomsen et al. | 358/29 |
| 4,712,132 | 12/1987 | Soca | 358/27 |

FOREIGN PATENT DOCUMENTS

| | | |
|---|---|---|
| 0381276 | 8/1990 | European Pat. Off. . |
| 5525207 | 4/1980 | Japan . |
| 62-7210 | 6/1987 | Japan . |
| 0863087 | 5/1986 | WIPO . |

Primary Examiner—Richard Hjerpe
Assistant Examiner—Chanh Nguyen

[57] ABSTRACT

A display apparatus includes manual keys provided to supply color temperature coefficients to contrast and brightness control units, so that an adjusted ratio of the color temperature coefficients is generated independently of contrast and brightness control signals. Consequently, a color temperature which is once determined, is maintained, even if contrast and brightness are changed.

7 Claims, 8 Drawing Sheets

MAXIMUM CONTRAST AND BRIGHTNESS

FIG. 3B

HALF CONTRAST

FIG. 3C

HALF BRIGHTNESS

FIG. 3D

HALF CONTRAST AND BRIGHTNESS

DISPLAY APPARATUS WITH COLOR TEMPERATURE CONTROL

This is a continuation of application Ser. No. 779,328, filed Oct. 15, 1991, now abandoned.

FIELD OF THE INVENTION

This invention relates to a display apparatus such as a CRT display, a liquid crystal display, etc., and more particularly to, a display apparatus in which the quality of color images is improved.

BACKGROUND OF THE INVENTION

A conventional CRT display which is used in a television set, a personal computer, etc. is provided with knobs for controlling contrast and brightness of images on a screen thereof, so that the quality of the images is improved in accordance with the adjustment of contrast and brightness by use of the knobs.

In recent years, a display apparatus in which the color tone (determined by the color temperature at the state of all white pattern display, and defined "color temperature" hereinafter) is adjusted in addition to the contrast and brightness is required to be put into practical use. In such a display apparatus, a desired color temperature is obtained to provide reddish white, bluish white, etc.

Such demand is high in a display apparatus for an information processing apparatus in which still images are displayed on a screen thereof, although the demand is relatively low in a television set in which motion images are displayed on a screen thereof, so that the color temperature is observed difficult to be due to the motion thereof. In addition, the demand of controlling the color temperature is high, for instance, in a display apparatus of a computer graphics system, an apparel design system, etc., in which the reproducibility of colors is important, because colors are required to be displayed precisely on a screen thereof.

In the conventional display apparatus, the color temperature is adjusted in a manufacturing factory by use of sub-contrast and sub-brightness knobs which are provided in the interior of the display apparatus, so that these knobs are not handled by a user.

However, the conventional display apparatus has disadvantages in that specialized operation and a considerably long time is required in the adjustment of the color temperature in the manufacturing factory. For this reason, even if a color temperature knob which is handled by a user is provided at the exterior of the display apparatus, this is not a practical structure.

In addition, it is considered that the color temperature must be adjusted for plural times, because the color temperature tends to change in a case where contrast and brightness are adjusted, after the color temperature is once adjusted. In other words, the so-called color tracking, in which the color temperature is not changed between before and after the adjustment of contrast and brightness, when the color temperature is once adjusted, is required to be realized in a display apparatus.

SUMMARY OF THE INVENTION

Accordingly, it is an object of the invention to provide a display apparatus in which the color temperature is adjusted independently to enhance the handling property.

It is a further object of the invention to provide a display apparatus in which the color tracking is automatically obtained.

According to the first feature of the invention, a display apparatus, comprises:

means for designating a color temperature;

means for generating color temperature coefficients to define a ratio of intensities of three primary colors, the ratio being determined by the color temperature;

means for linearly amplifying three input primary color signals to provide a predetermined contrast; and means for controlling the linearly amplifying means to carry out linear amplifications of the three input primary color signals, gains of the linear amplifications being determined in accordance with multiplications of the color temperature coefficients by a contrast control signal.

According to the second feature of the invention, a display apparatus, comprises:

means for designating a color temperature;

means for generating color temperature coefficients to define a ratio of intensities of three primary colors, the ratio being determined by the color temperature;

means for providing three input primary color signals with predetermined direct current shift amounts to provide a predetermined brightness; and means for controlling the providing means to generate three primary color signals having the predetermined direct current shift amounts which are determined in accordance with multiplications of the color temperature coefficients by a brightness control signal.

According to the third feature of the invention, a display apparatus, comprises:

means for designating a color temperature;

means for generating color temperature coefficients to define a ratio of intensities of three primary colors, the ratio being determined by the color temperature;

means for linearly amplifying three input primary color signals to provide a predetermined contrast;

means for controlling the linearly amplifying means to carry out linear amplifications of the three input primary color signals, gains of the linear amplifications being determined in accordance with multiplications of the color temperature coefficients by a contrast control signal;

means for providing the three input primary color signals thus linearly amplified with predetermined direct current shift amounts to provide a predetermined brightness; and means for controlling the providing means to generate three primary color signals having the predetermined direct current shift amounts which are determined in accordance with multiplications of the color temperature coefficients by a brightness control signal.

BRIEF DESCRIPTION OF THE DRAWINGS

This invention will be explained in more detail in conjunction with appended drawings, wherein.

DESCRIPTION OF THE PREFERRED EMBODIMENTS

Figure 1:
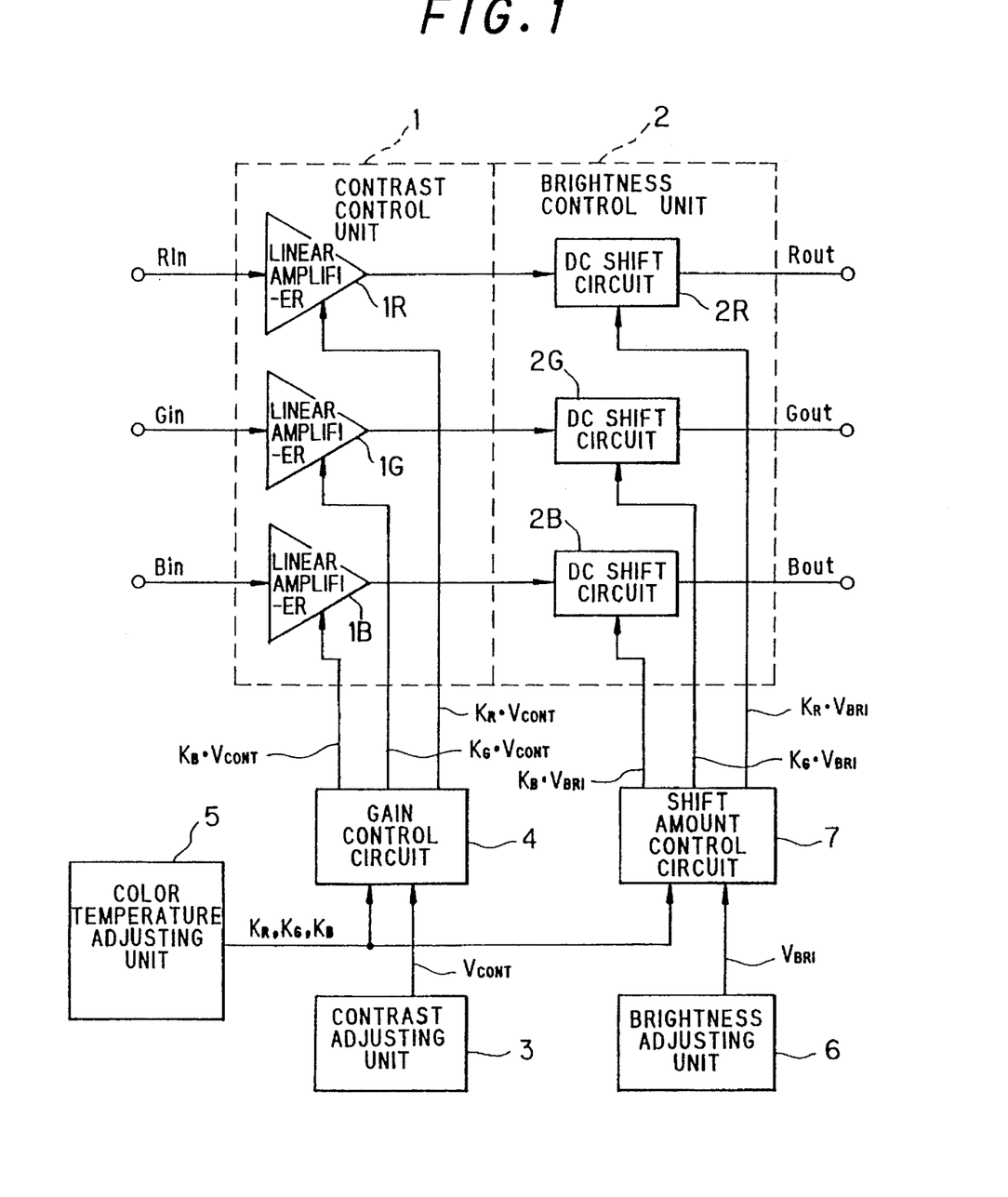
FIG. 1 is a block diagram showing a display apparatus of a first preferred embodiment according to the invention.

FIG. 1 shows a display apparatus of the first preferred embodiment which comprises a contrast control unit 1, a brightness control unit 2, a contrast adjusting unit 3, a gain control circuit 4, a color temperature adjusting unit 5, a brightness adjusting unit 6, and a shift amount control circuit 7.

In the contrast control unit 1, primary color signals Rin, Gin and Bin are supplied to linear amplifiers 1R, 1G and 1B to be amplified therein.

In the brightness control unit 2, the color signals which are amplified in the linear amplifiers 1R, 1G and 1B are supplied to direct current (DC) shift circuits 2R, 2G and 2B, in which DC levels of the primary color signals Rin, Gin and Bin are shifted to provide DC shifted primary color signals Rout, Gout and Bout which are then supplied to cathodes of respective primary color signals for a cathode ray tube.

As described later, the adjustment of contrast is carried out by changing gains of the linear amplifiers 1R, 1G and 1B, and the adjustment of brightness is carried out by changing DC shift amounts of the DC shift circuits 2R, 2G and 2B.

The contrast is adjusted independently of the color temperature in accordance with the provision of the contrast adjusting unit 3, the gain control circuit 4, and the color temperature adjusting unit 5.

In the contrast adjusting unit 3, a knob is handled to provide contrast information by an operator, so that a contrast control signal $V_{CONT}$ which is common to the primary color signals is generated to be supplied to the gain control circuit 4. In the color temperature adjusting unit 5, a knob is handled to provide a color temperature by an operator, so that color temperature coefficients $K_R$, $K_G$ and $K_B$ for the respective primary color signals are generated to be supplied to the gain control circuit 4, from which the gain control signals $G_R(K_R \cdot V_{CONT})$, $G_G(K_G \cdot V_{CONT})$ and $G_B(K_B \cdot V_{CONT})$ are supplied to the linear amplifiers 1R, 1G and 1B, respectively. Consequently, the primary color signals Rin, Gin and Bin are amplified in the linear amplifiers 1R, 1G and 1B by gains which are determined by products of the gain control signals $G_R$, $G_G$ and $G_B$ and an inherent gain A, that is, "$A \cdot K_R \cdot V_{CONT}$", "$A \cdot K_G \cdot V_{CONT}$", and "$A \cdot K_B \cdot V_{CONT}$", respectively.

In addition, the brightness is adjusted independently of the color temperature in accordance with the provision of the color temperature adjusting unit 5, the brightness adjusting unit 6, and the shift amount control circuit 7.

In the brightness adjusting unit 6, a knob is handled to provide brightness information by an operator, so that a brightness control signal $V_{BRI}$ which is common to the primary color signals is generated to be supplied to the shift amount control circuit 7. In the color temperature adjusting unit 5, a knob is handled to provide a color temperature by an operator, so that color temperature coefficients $K_R$, $K_G$ and $K_B$ for the respective primary color signals are generated to be supplied to the shift amount control circuit 7, from which the shift amount control signals $S_R(K_R \cdot V_{BRI})$, $S_G(K_G \cdot V_{BRI})$, and $S_B(K_B \cdot V_{BRI})$ are supplied to the DC shift circuit 2R, 2G and 2B, respectively. Consequently, shift operation is carried out in the DC shift circuits 2R, 2G and 2B, so that black levels are set to be "$V_{RCO} - K_R \cdot V_{BRI}$", "$V_{GCO} - K_G \cdot V_{BRI}$", and "$V_{BCO} - K_B \cdot V_{BRI}$", respectively, where $V_{RCO}$, $V_{GCO}$ and $V_{BCO}$ are cut-off levels of the cathode ray tube.

In this first preferred embodiment, the color tracking is automatically obtained even at the state that contrast and/or brightness are changed.

This will be explained in FIGS. 2A to 2D and 3A to 3D.

First, voltages applied to cathodes of a CRT will be explained in relation to contrast, brightness and color temperature, respectively.

Figure 2A:
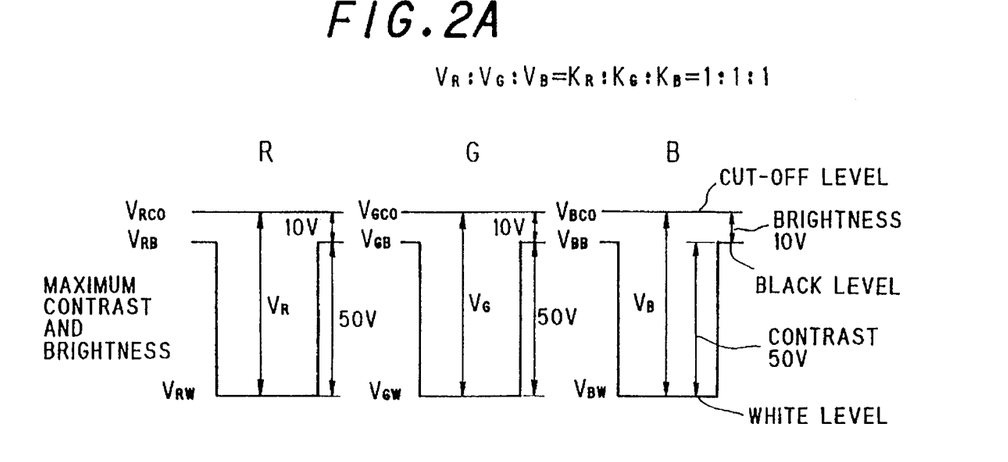
FIGS. 2A to 2D and 3A to 3D are explanatory diagrams explaining principle of the color tracking in the first preferred embodiment.

FIG. 2A shows exampled relations of cut-off levels $V_{RCO}$, $V_{GCO}$ and $V_{BCO}$ to white levels $V_{RW}$, $V_{GW}$ and $V_{BW}$, respectively, for the primary color signals R, G and B.

In the relations, the brightness is determined by a difference between a corresponding one of the cut-off levels $V_{RCO}$, $V_{GCO}$ and $V_{BCO}$ and a corresponding one of the black levels $V_{RB}$, $V_{GG}$ and $V_{BB}$. On the other hand, the color temperature is determined by a ratio among intensities $V_R$, $V_G$ and $V_B$ which are differences between the levels $V_{RCO}$ and $V_{RW}$, $V_{GCO}$ and $V_{GW}$, and $V_{BCO}$ and $V_{BW}$. As understood in FIG. 2A, the intensities $V_R$, $V_G$ and $V_B$ are sums of the brightness components and the contrast components for the respective original color signals R, G and B.

Accordingly, even if the contrast and the brightness are changed, the color temperature is not changed, as long as a ratio $K_R:K_G:K_B$ is constant among the intensities $V_R$, $V_G$ and $V_B$ for the primary color signals R, G, and B.

In FIG. 2A, the color temperature is shown in a case where the ratio $K_R:K_G:K_B$ is 1:1:1 which is determined by the intensities $V_R$, $V_G$ and $V_B$. Hereinafter $K_R$, $K_G$ and $K_B$ are defined as color temperature coefficients.

Figure 2B:
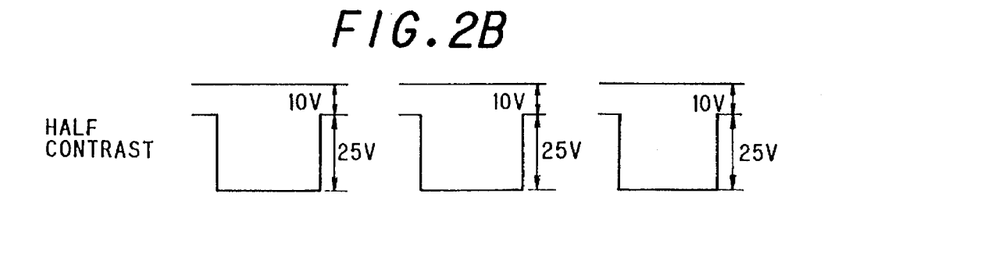

In FIG. 2B, there is shown a case in which the contrast is decreased from 50V to 25V by 50%, as compared to that of FIG. 2A, while the color temperature is maintained by keeping the intensity ratio 1:1:1 (35V:35V:35V) unchanged.

Figure 2C:
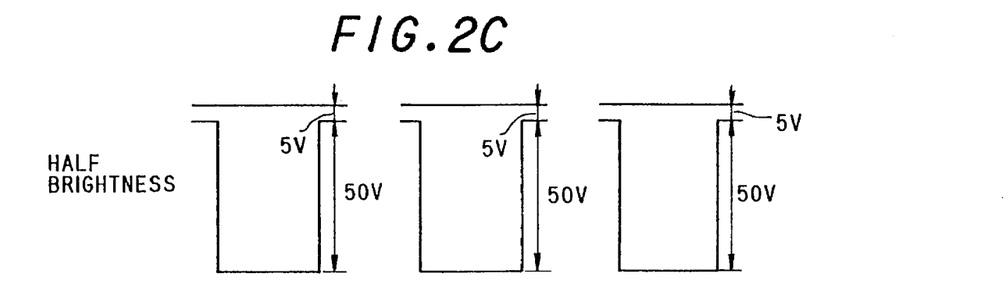

In FIG. 2C, there is shown a case in which the brightness is decreased from 10V to 5V by 50%, as compared to that of FIG. 2A, while the color temperature is maintained by keeping the intensity ratio 1:1:1 (55V:55V:55V) unchanged.

Figure 2D:
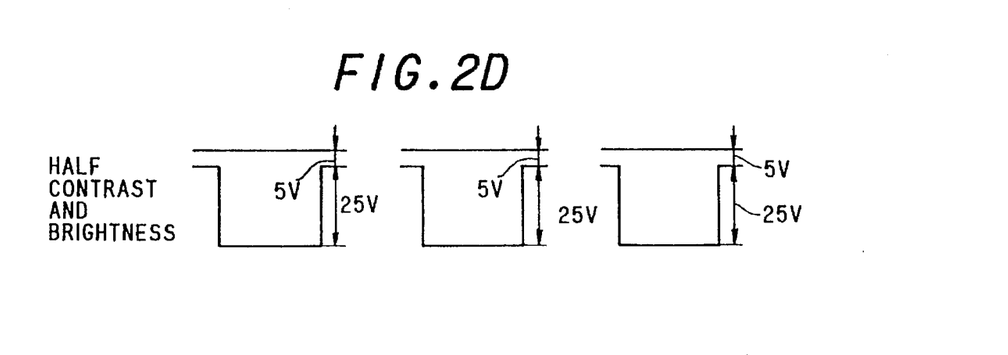

In FIG. 2D, there is shown a case in which the contrast and the brightness are decreased from 50V to 25V and from 10V to 5V, respectively, by 50%, as compared to those of FIG. 2A, while the color temperature is maintained by keeping the intensity ratio 1:1:1 (30V:30V:30V) unchanged.

Figure 3A:
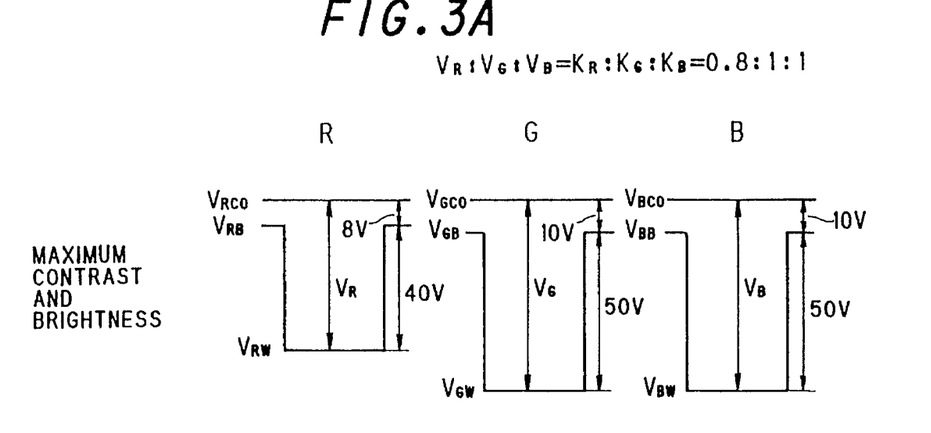

In FIG. 3A, there is shown a case in which the color temperature is changed by changing the intensity ratio from 1:1:1 (60V:60V:60V) to 0.8:1:1 (48V:60V:60V), as compared to that of FIG. 2A. In this case, the maximum values of the contrast and the brightness have a ratio of 0.8 in the red signal R relative to those in the green and blue signals G and B. In this manner, it is preferable in regard to the adjustment of the contrast and the brightness that both are changed by the same proportion, but only one of the contrast and the brightness is not changed.

Figure 3B:
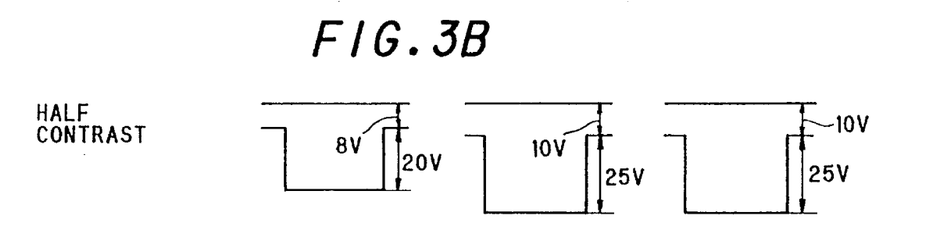

In FIG. 3B, there is shown a case in which the contrast is decreased from 40V to 20V in the red signal R and from 50V to 25V in the green and blue signals G and B, respectively, by 50%, as compared to that of FIG. 3A, while the color temperature is maintained by keeping the intensity ratio 0.8:1:1 (28V:35V:35V) unchanged.

Figure 3C:
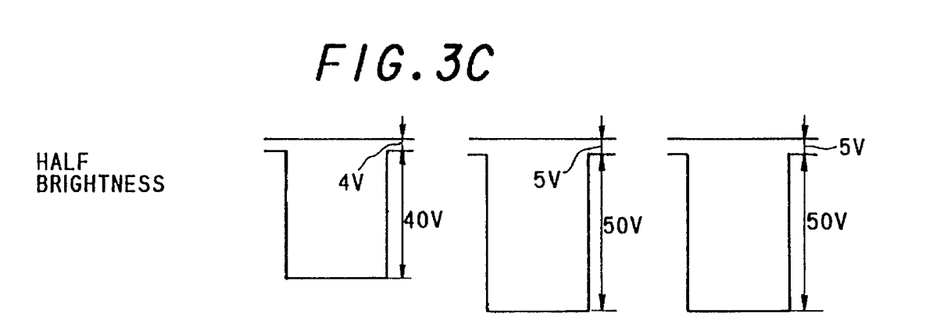

In FIG. 3C, there is shown a case in which the brightness is decreased from 8V to 4V in the red signal R and from 10V to 5V in the green and blue signals G and B, respectively, by 50%, as compared to that of FIG. 3A, while the color temperature is maintained by keeping the intensity ratio 0.8:1:1 (44V:55V:55V) unchanged.

Figure 3D:
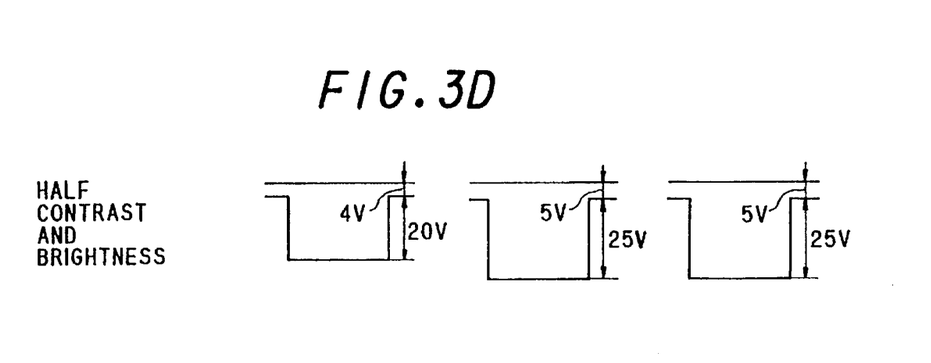

In FIG. 3D, there is shown a case in which the contrast is decreased from 40V to 20V in the red signal R and from 50V to 25V in the green and blue signals G and B, respectively, by 50%, as compared to that of FIG. 3A, and the brightness is also decreased from 8V to 4V in the red signal R and from 10V to 5V in the green and blue signals G and B, respectively, by 50%, while the color temperature is maintained by keeping the intensity ratio 0.8:1:1 (24V:30V:30V) unchanged.

Changing view points, the cases of FIG. 3B to 3D are regarded that the color temperature is changed, as compared to the cases of FIG. 2B to 2D.

As explained above, each of the intensities $V_R$, $V_G$ and $V_B$ is determined by a sum of a corresponding contrast and a corresponding brightness, and the ratio $K_R:K_G:K_B$ of the intensities $V_R$, $V_G$ and $V_B$ is well maintained by equalizing a ratio of the contrast values for the color signals R, G and B and a ratio of the brightness values for the color signals R, G and B to the intensity ratio.

As explained in FIG. 1, when the gains of the linear amplifiers 1R, 1G and 1B are set to be "$A \cdot K_R \cdot V_{CONT}$", "$A \cdot K_G \cdot V_{CONT}$", and "$A \cdot K_B \cdot V_{CONT}$", respectively, the color temperature is maintained in accordance with the unchanged intensity ratio $K_R:K_G:K_B$, even if the contrast is changed. In addition, when the shift amounts of the DC shift circuits 2R, 2G and 2B are set to be "$K_R \cdot V_{BRI}$", "$K_G \cdot V_{BRI}$", and "$K_B \cdot V_{BRI}$", respectively, the color temperature is maintained in accordance with the unchanged intensity ratio $K_R:K_G:K_B$, even if the brightness is changed.

As clearly understood from the above explanation, the gains of the linear amplifiers 1R, 1G and 1B define a difference of the black and white levels, and the shift amounts of the DC shift circuits 2R, 2G and 2B define a difference of the cut-off and black levels.

In this first preferred embodiment, the intensities $V_R$, $V_G$ and $V_B$ of the primary color signals R, G and B are defined by the equations (1), (2) and (3).

$$V_R = K_R(V_{CONT} \cdot A + V_{BRI}) \quad (1)$$

$$V_G = K_G(V_{CONT} \cdot A + V_{BRI}) \quad (2)$$

$$V_B = K_B(V_{CONT} \cdot A + V_{BRI}) \quad (3)$$

As apparent from the equations (1), (2) and (3), the color temperature is maintained in accordance with the intensity ratio $K_R:K_G:K_B$ independently of the contrast and brightness control signals $V_{CONT}$ and $V_{BRI}$. At the same time, the color temperature is changed by use of the color temperature adjusting unit 5. As a matter of course, the color temperature is not necessary to be re-adjusted, even after the contrast and the brightness are changed. Therefore, a desired color temperature is obtained in a short time by simple operation.

Next, a display apparatus of the second preferred embodiment according to the invention will be explained.

Even in this second preferred embodiment, the color tracking is realized in accordance with the aforementioned equations (1) to (3).

Figure 4:
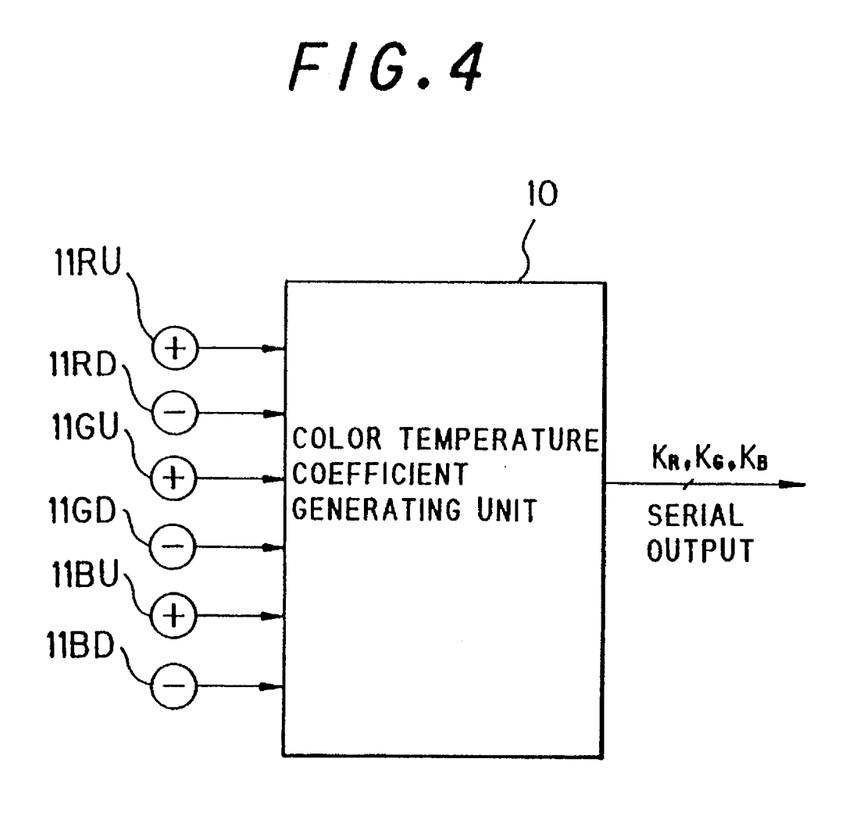
FIG. 4 is a block diagram showing a circuit for generating color temperature coefficients in a display apparatus of a second preferred embodiment according to the invention.
Figure 5:
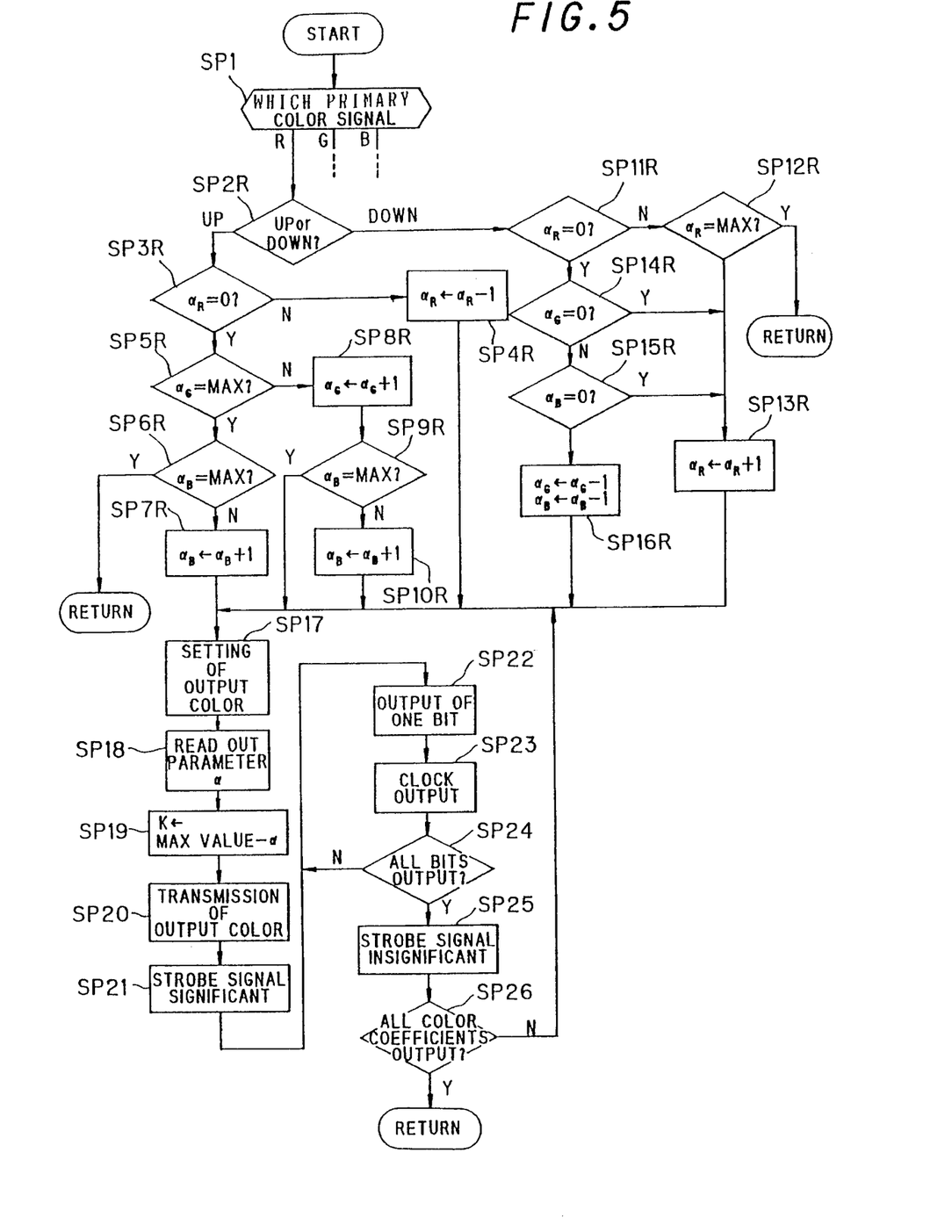
FIG. 5 is a flow chart explaining the generation of the color temperature coefficients in the second preferred embodiment.

FIG. 4 shows a hardware structure for generating color temperature coefficients $K_R$, $K_G$ and $K_B$ which is used in the second preferred embodiment. This hardware structure comprises a color temperature coefficient generating unit 10 including a microprocessor and a memory, up-keys 11RU, 11GU and 11BU for increasing the proportion of the color temperature coefficients $K_R$, $K_G$ and $K_B$, and down keys 11RD, 11GD and 11BD for decreasing the proportion of the color temperature coefficients $K_R$, $K_G$ and $K_B$. The color temperature coefficient generating unit 10 generates the color temperature coefficients $K_R$, $K_G$ and $K_B$ in accordance with the processing as shown in FIG. 5, when any one of the up keys 11RU, 11GU and 11BU, and the down keys 11RD, 11GD and 11BD is pressed.

In operation, it is determined which key pressed, and to which primary color the key related among the primary color signals R, G and B, when any one of the up keys 11RU, 11GU and 11BU, and the down keys 11RD, 11GD and 11BD is pressed, the processing steps are then carried out for an primary color signal selected from the primary color signals R, G and B (step "SP1"). In the following description, the processing of the red color signal R will be explained, and this will be applied to the processing of the green and blue color signals G and B.

When it is determined that a key for the red color signal R is pressed, it is then determined whether the pressed key is an up or down key (step "SP2R"). When the up key 11RU is pressed, it is determined whether a parameter "αR" is zero or not (step "SR3R"). Here, the parameter "αR" is used to determine a color temperature coefficient $K_R$ by subtracting the parameter "αR" from the maximum value, for instance, 1000 of the color temperature coefficient $K_R$. Therefore, it is said that the decision of the step "SP3R" is a decision as to whether the color temperature coefficient $K_R$ is the maximum value or not at the very moment.

If the parameter "αR" is not zero, the parameter "αR" is decremented to provide a parameter "αR−1" by one (step "SR4R").

On the other hand, the parameter "αR" is zero, the color temperature coefficient $K_G$ or $K_B$ is decreased, because the color temperature coefficient $K_R$ can not be increased any more (step "SP9R" to "SP10R"), so that a red color component of the color temperature is increased relatively. That is, if both parameters "αG" and "αB" for green and blue colors are not the maximum value, the parameters "αG" and "αB" are incremented to provide parameters "αG+1" and "αB+1", respectively, by one, and the step "SP17" and following steps are then carried out on the other hand, if only one of the parameters "αG" and "αB" is not the maximum value, the parameter "αG" or "αB" having no maximum value is incremented by one, and the step "SP17" and the following steps are carried out.

Otherwise, if both the parameters "αG" and "αB" are the maximum value, the output of the color temperature coefficients $K_R$, $K_G$ and $K_B$ is not carried out, and the processing is returned to a main routine of the flow, because the red component can not be increased relatively.

On the contrary, when the pressed key is determined to be the down key 11RD (step "SP2R"), it is determined whether the parameter "αR" is zero or not (step "SP11R"). If the parameter "αR" is not zero, it is determined whether the parameter "αR" the maximum value or not (step "SP12R"). When the parameter "αR" is the maximum value, the processing returned to the main routine of the flow, because a red color component of the color temperature can not be decreased. On the other hand, when the parameter "αR" is not the maximum value, the parameter "αR" is increased by one, and the processing is shifted to the step "SP13R". When it is determined that the parameter "αR" is zero, it is determined whether at least one of the parameters "αG" and "αB" is zero or not (steps "SP14R" and "SP15R"). In this decision, "YES" is met, the parameter "αR" is incremented by one, and the processing is shifted to the step "SP17" (step "SP13R"). On the other hand, when both the parameters "αG" and "αB" are not zero, the parameters "αG" and "αB" are decremented by one, and the processing is shifted to the step "SP17" (step "SP16R").

The up processing of the red color component thereof (steps "SP11R" to "SP16R") are not symmetrical, because it is assumed that at least one of the color temperature coefficients $K_R$, $K_G$ and $K_B$ is the maximum value. When at least one of the color temperature coefficients $K_R$, $K_G$ and $K_B$ is set to be the maximum value, the maximum number of color temperatures are defined, and the most bright screen is obtained under a state a color temperature is designated.

As explained later, each of a contrast control unit includes a multiplication type digital to analog converter, so that the color temperature coefficients $K_R$, $K_G$ and $K_B$ is the maximum value. When at least one of the color temperature coefficients $K_R$, $K_G$ and $K_B$ is set to be the maximum value, the maximum number of color temperatures are defined, and the most bright screen is obtained under a state a color temperature is designated.

As explained later, each of a contrast control unit and a brightness control unit includes a multiplication type digital to analog converter, so that the color temperature coefficients $K_R$, $K_G$ and $K_B$ are supplied from the color temperature coefficient generating unit 10 to the contrast and brightness control units so as to be adapted to the contrast and brightness control units.

At the step "SP17", a flag is set to designate a color temperature coefficient which is supplied to the contrast and brightness control units. Then, one of the parameters aR, aG and aB relating to the flag is read out, and a corresponding color temperature coefficient (one of $K_R$, $K_G$ and $K_B$) is calculated by subtracting the parameter from the maximum value thereof (step "SP18" and "SP19"). Thereafter, the output of channel data is carried out, and it is made clear to which primary color signal the color temperature coefficient relates. At the same time, a strobe signal becomes significant, and each bit of the color temperature coefficient is supplied in serial to the contrast control unit by a clock signal (step "SP20" to "SP24"). When the output of all bits of the color temperature coefficient finishes, the strobe signal becomes insignificant.

In this manner, when the output of the color temperature coefficient finishes for one primary color, it is determined whether the output of the color temperature coefficients $K_R$, $K_G$ and $K_B$ finishes or not for the primary color signals R, G and B. When this output operation does not finish completely, the processing is returned to the step "SP17", so that the output of the color temperature coefficient continues for the remaining primary color signal. Finally, when the output of the color temperature coefficients finishes for all the primary color signals R, G and B, the processing is returned to the main routine of the flow (step "SP26").

Figure 6:
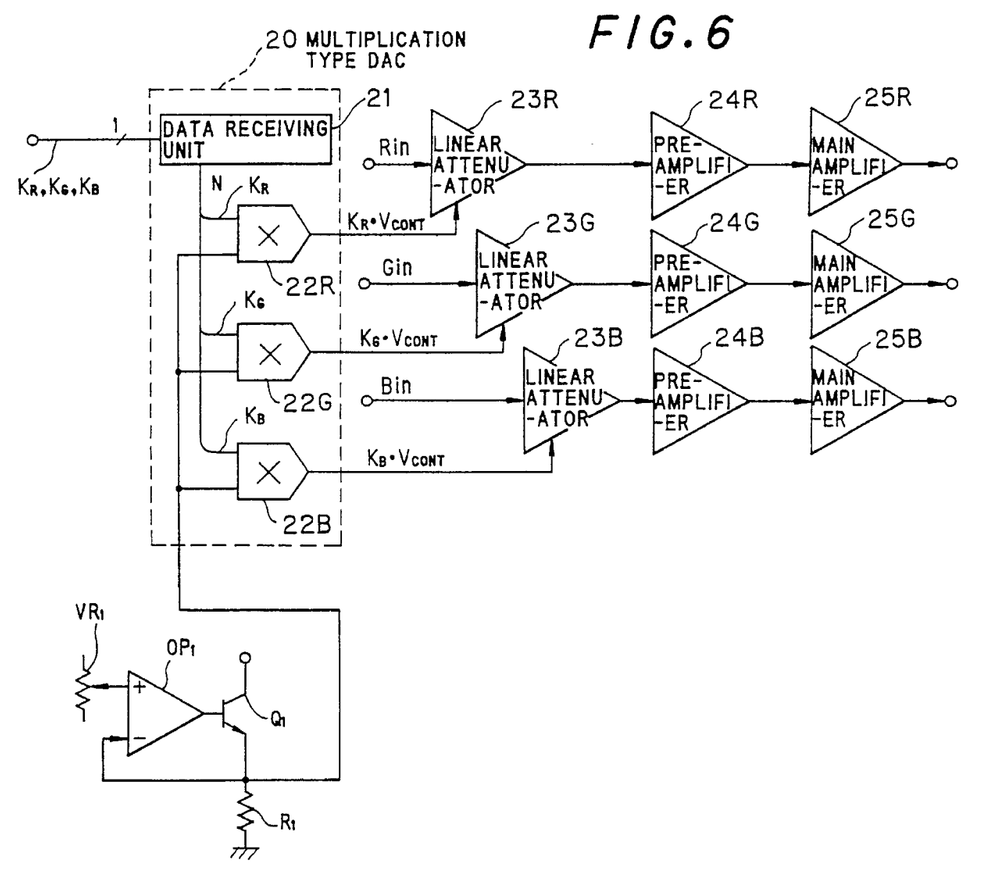
FIG. 6 is a block diagram showing a contrast control unit in the second preferred embodiment.

Next, FIG. 6 shows the contrast control unit used in the display apparatus of the second preferred embodiment.

In the contrast control unit, the color temperature coefficients $K_R$, $K_G$ and $K_B$, each of which is classified to designate one of the primary color signals R, G and B by the channel data, are supplied to a multiplication type digital to analog converter 20 which includes a data receiving unit 21, and three multipliers 22R, 22G and 22B. The data receiving unit 21 determines an primary color signal to which a serially received color temperature coefficient relates and converts the color temperature coefficient to a parallel color temperature coefficient which is supplied to a corresponding one of the multipliers 22R, 22G and 22B.

The contrast control unit further comprises a volume $VR_1$ for supplying a contrast control signal through a voltage follower circuit including an operational amplifier $OP_1$, a transistor $Q_1$, and a resistance $R_1$ commonly to the multipliers 22R, 22G and 22B. Thus, the multipliers 22R, 22G and 22B supply gain control signals "$K_R \cdot V_{CONT}$", "$K_G \cdot V_{CONT}$" and "$K_B \cdot V_{CONT}$" to amplifying stages for the primary color signals R, G and B. The amplifying stages include linear attenuators 23R, 23G and 23B, pre-amplifiers 24R, 24G and 24B, and main amplifiers 25R, 25G and 25B, wherein the attenuation factor is changed for the linear attenuators 24R, 23G and 23B by the gain control signals "$K_R \cdot V_{CONT}$", "$K_G \cdot V_{CONT}$" and "$K_B \cdot V_{CONT}$", and gains of the pre-amplifiers 24R, 24G and 24B, and the main amplifiers 25R, 25G and 25B are fixed, so that input signals Rin, Gin and Bin for the primary color signals R, G and B supplied to the linear attenuators 24R, 23G and 23B are amplified in the amplifying stages to provide amplified output signals by gains of "$A \cdot K_R \cdot V_{CONT}$", "$A \cdot K_G \cdot V_{CONT}$", and "$A \cdot K_B \cdot V_{CONT}$".

Practically, it is hard to adjust a gain linearly at a video signal band by use of a single amplifier which is controlled by a gain control signal. Therefore, an amplifier having a fixed gain is combined with a linear attenuator, so that a linear amplifier is obtained as a whole.

Figure 7:
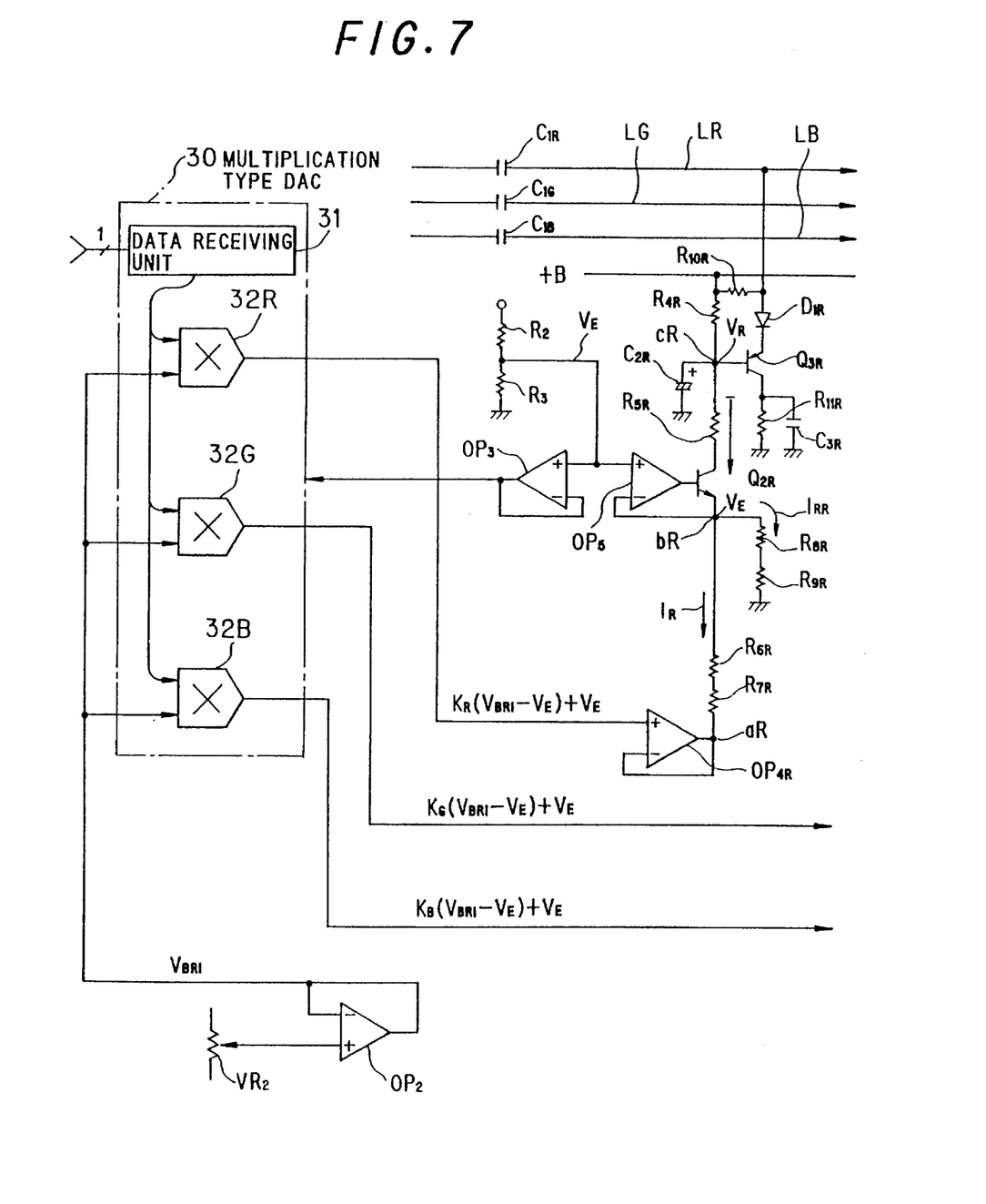
FIG. 7 is a block diagram showing a brightness control unit in the second preferred embodiment.

Further, FIG. 7 shows the brightness control unit which is used in the display apparatus of the second preferred embodiment. In this brightness control unit, a multiplication type digital to analog converter 30 comprises a data receiving units 31, and three multipliers 32R, 32G and 32B, wherein the data receiving unit 31 determines an primary color signal to which a serially received color temperature coefficient relates, and converts the color temperature coefficient to a parallel color temperature which is supplied to a corresponding one of the multipliers 32R, 32G and 32B.

The brightness control unit further comprises a brightness volume $VR_2$ for supplying a brightness control signal through a voltage follower circuit of an operational amplifier $OP_2$ commonly to the multipliers 32R, 32G and 32B. The multipliers 32R, 32G and 32B supply voltages "$K_R(V_{BRI} - V_E) + V_E$", "$K_G(V_{BRI} - V_E) + V_E$", and "$K_B(V_{BRI} - V_E) + V_E$" to DC clamp stages, wherein the voltage $V_E$ which is obtained in a division of a power supply voltage by resistances $R_2$ and $R_3$ is applied through a voltage follower circuit of an operational amplifier $OP_3$ to a reference voltage input terminal of the multiplication type digital to analog converter 30. The voltage $V_E$ is not equal to a cut-off level, but corresponds to the cut-off level.

In this brightness control unit, the primary color signals which have been already controlled in contrast are passed through capacitances $C_{1R}$, $C_{1G}$, $C_{1B}$ provided on output lines $L_R$, $L_G$, and $L_R$ which are connected to cathode terminals of a CRT, so that direct current components of the primary color signals to be applied to the cathode terminals are removed.

The DC clamp stage for the red signal will be explained. The output voltage "$K_R(V_{BRI} - V_E) + V_E$" of the multiplier 32R is applied through a voltage follower circuit of an operational amplifier $OP_{4R}$ to a modal point aR. Resistances $R_{4R}$ and $R_{5R}$, a collector and an emitter of an NPN transistor $Q_{2R}$, a resistance $R_{6R}$ and a variable resistance $R_{7R}$ are connected between the nodal point aR and a power supply voltage line +B. The transistor $Q_{2R}$ provides a voltage follower circuit together with an operational amplifier $OP_5$ common to the primary color signals R, G and B, and a potential of the emitter of the transistor $Q_{2R}$ is the divided voltage $V_E$ of the resistances $R_2$ and $R_3$ at a nodal point bR which is connected through a resistance $R_{8R}$ and a variable resistance $R_{9R}$ to ground. Further, a nodal point cR between the resistances $R_{4R}$ and $R_{5R}$ is connected through a charge and discharge capacitance $C_{2R}$ to ground.

A potential of the capacitance $C_{2R}$ defines an intensity $V_R$ which is determined by a collector current of the transistor $Q_{2R}$. This collector current is a sum of a current $I_{RR}$ flowing through a resistance $R_{8R}$ and a variable resistance $R_{9R}$ and a current $I_R$ flowing through a resistance $R_{6R}$ and a variable resistance $R_{7R}$.

The current $I_{RR}$ is a fixed value, after the variable resistance $R_{9R}$ is adjusted to be fixed, because the potential $V_E$ is fixed at the nodal point bR. That is, the resistance $R_{8R}$ and the variable resistance $R_{9R}$ is used for determining the fixed level having a connection with the intensity $V_R$, so that a cut-off level is adjusted.

The current $I_R$ is determined by a voltage $K_R \cdot (V_{BRI} - V_E)$, after the variable resistance $R_{7R}$ is adjusted to be fixed. This variable resistance $R_{7R}$ functions as a sub-brightness adjusting resistance.

Accordingly, the collector current "$I_{RR} + I_R$" and the intensity $V_R$ are changed only by the output voltage "$K_R(V_{BRI} - V_E) + V_E$" of the multiplier 32R, and these changes are proportional to the voltage change "$K_R(V_{BRI} - V_E)$". Here, the change of the intensity $V_R$ which is carried out without the change of a contrast component is identical to the change of brightness.

Thus, the direct current shift can be carried out in accordance with the color temperature coefficient $K_R$ and the brightness control signal $V_{BRI}$.

In addition, there are provided a resistance $R_{10R}$ connected between the output line $L_R$ and the power supply voltage line +B, a PNP transistor $Q_{3R}$ connected at a base to the nodal point CR, a diode $D_{1R}$ connected at an anode to the output line $L_R$ and at a cathode to an emitter of the transistor $Q_{3R}$, and a parallel connection of a resistance $R_{11R}$ and a capacitance $C_{3R}$ positioned between a collector of the transistor $Q_{3R}$ and ground.

Even in this second preferred embodiment, the color temperature can be varied by use of a handling structure for directly designating the color temperature. Even more, the color temperature is maintained under a state that the contrast and/or the brightness are adjusted, so that the re-adjustment of the color temperature becomes unnecessary. Therefore, a desired color temperature is obtained in a short time by simple operation.

A display apparatus of the third preferred embodiment according to the invention will be explained.

Figure 8:
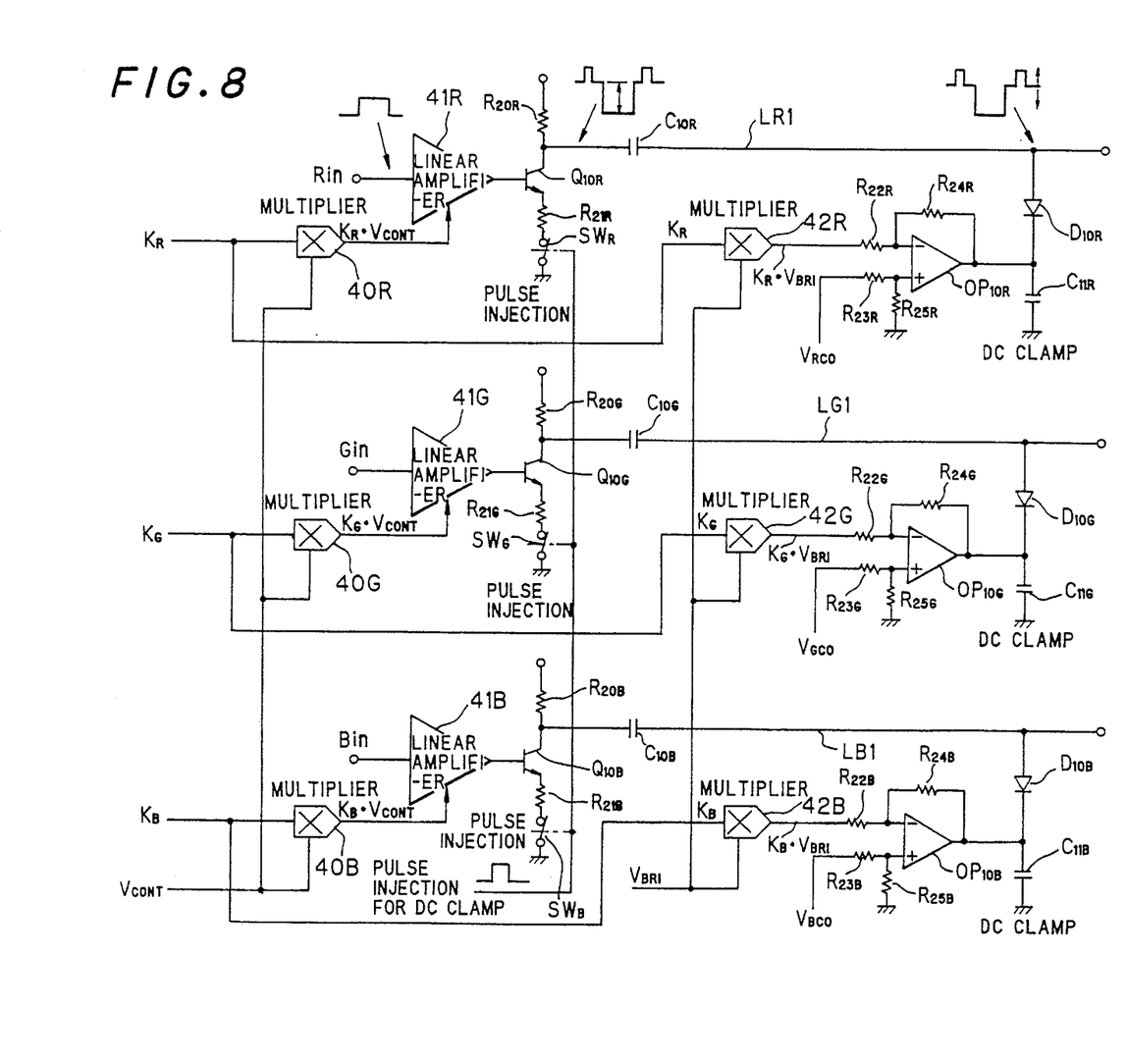
FIG. 8 is a block diagram showing a display apparatus of a third preferred embodiment according to the invention.

FIG. 8 shows a contrast control unit used in the display apparatus of the third preferred embodiment.

In the contrast control unit, color temperature coefficients $K_R$, $K_G$ and $K_B$ of digital signals are generated in a color temperature coefficient generating unit (not shown) in accordance with signals from handling knobs (not shown) for varying the color temperature, and the color temperature coefficients $K_R$, $K_G$ and $K_B$ are converted from digital data to analog data in a digital to analog converter to be supplied to analog multipliers 40R, 40G and 40B.

A contrast control signal $V_{CONT}$ which is supplied from a contrast volume (not shown) including usually an impedance conversion circuit is also supplied commonly to the analog multipliers 40R, 40G and 40B. As a result, multiplied signals "$K_R \cdot V_{CONT}$", "$K_G \cdot V_{CONT}$", and "$K_B \cdot V_{CONT}$" are obtained to be supplied to linear amplifiers 41R, 41G and 41B, in which input primary color signals Rin, Gin and Bin are amplified by using the multiplied signals as gain control signals.

The linear amplifiers 41R, 41G and 41B are connected to clamp pulse injecting stages comprising resistances $R_{20R}$, $R_{20G}$ and $R_{20B}$, NPN transistors $Q_{10R}$, $Q_{10G}$ and $Q_{10B}$, resistances $R_{21R}$, $R_{21G}$ and $R_{21B}$, and switches $SW_R$, $SW_G$ and $SW_B$, correspondingly, positioned between a power supply voltage line and ground. In these clamp pulse injecting stages, when the switches $SW_R$, $SW_G$ and $SW_B$ are turned on, amplified output signals of the linear amplifiers 41R, 41G and 41B are supplied to bases of the transistors $Q_{10R}$, $Q_{10G}$ and $Q_{10B}$, so that the output signals are inverted to be amplified therein and supplied from collectors thereof to following stages. On the other hand, when the switches $SW_R$, $SW_G$ and $SW_B$ are turned off, output signals of the power supply voltage are supplied to the following stages for the off duration. In this manner, clamp pluses are injected along color signal lines to be used in direct current clamp circuits (to be explained later). Here, the injection of the clamp pulses is carried out during horizontal and vertical blanking periods.

In this third preferred embodiment, the input primary color signals Rin, Gin and Bin are inverted in the clamp pulse injecting stages, so that the white level is higher in polarity than the black level. Referring to the aforementioned equations (1) to (3), total gains of the linear amplifiers 41R, 41G and 41B and the clamp pulse injecting stages are required to be equal to "$A \cdot K_R \cdot V_{CONT}$", "$A \cdot K_G \cdot V_{CONT}$" and "$A \cdot K_B \cdot V_{CONT}$", respectively.

As explained above, the contrast control unit is composed of the multipliers 40R, 40G and 40B, the linear amplifiers 41R, 41G and 41B, and the clamp pulse injecting stages.

Output signals of the clamp pulse injecting stages are passed through direct current removing capacitances $C_{10R}$, $C_{10G}$ and $C_{10B}$ to be transmitted along output lines $L_{R1}$, $L_{G1}$ and $L_{B1}$ connected to cathodes of a CRT. Direct current clamp circuits (direct current shift circuits) including diodes $D_{10R}$, $D_{10G}$ and $D_{10B}$ and capacitances $C_{11R}$, $C_{11G}$ and $C_{11B}$ are positioned between a corresponding one of the output lines $L_{R1}$, $L_{G1}$ and $L_{B1}$ and ground to clamp direct current in accordance with charge voltages of the capacitances $C_{11R}$, $C_{11G}$ and $C_{11B}$.

The capacitances $C_{11R}$, $C_{11G}$ and $C_{11B}$ are charged in a following manner.

The analog color temperature coefficients $K_R$, $K_G$ and $K_B$ are supplied to analog multipliers 42R, 42G and 42B, correspondingly. At the same time, a brightness control signal $V_{BRI}$ supplied from a brightness volume (not shown) usually including an impedance conversion circuit is also supplied commonly to the analog multipliers 42R, 42G and 42B. As a result, multiplied signals "$K_R \cdot V_{BRI}$", "$K_G \cdot V_{BRI}$" and "$K_B \cdot V_{BRI}$" are obtained in the multipliers 42R, 42G and 42B to be supplied to corresponding differential amplifying circuits which comprise operational amplifiers $OP_{10R}$, $OP_{10G}$ and $OP_{10B}$, input resistances $R_{22R}$ and $R_{23R}$, $R_{22G}$ and $R_{23R}$, and $R_{22B}$ and $R_{23B}$, negative feedback resistances $R_{24R}$, $R_{24G}$ and $R_{24B}$, ground resistances, $R_{25R}$, $R_{25G}$ and $R_{25B}$, respectively, which are connected to each other as shown in FIG. 8. The operational amplifiers $OP_{10R}$, $OP_{10G}$ and $OP_{10B}$ receive the multiplied signals "$K_R \cdot V_{BRI}$", "$K_G \cdot V_{BRI}$" and "$K_B \cdot V_{BRI}$" at inverted inputs, and CRT cut-off level signals $V_{RCO}$, $V_{GCO}$ and $V_{BCO}$ specified for the primary color signals R, G and B at non-inverted inputs.

The above described direct current clamp circuits, multipliers and differential amplifying circuits provide a brightness control unit.

In this brightness control unit, charge voltages of the capacitances $C_{11R}$, $C_{11G}$ and $C_{11B}$ are levels "$V_{RCO}-K_R \cdot V_{BRI}$", "$V_{GCO}-K_G \cdot V_{BRI}$" and "$V_{BCO} \cdot K_B \cdot V_{BRI}$", which are black levels for output signals Rout, Gout and Bout of the primary color signals R, G and B. It should be noted that the aforementioned equations (1) to (3) are met even in this third preferred embodiment. Therefore, the advantages set out in the first and second preferred embodiments are obtained in this third preferred embodiment.

In the first to third preferred embodiments, the invention is applied to a CRT display apparatus. In the same manner, the invention is also applied to a liquid crystal display apparatus, in which contrast and brightness are controlled in accordance with the adjustment of bias voltage and transmission coefficient by control of voltage.

The invention is most effective in a display apparatus which is used as a periphery apparatus of an information processing apparatus, and in which static images are displayed on a screen thereof. However, the invention is also applied to a CRT display apparatus of a television set, in which motion images are displayed on a screen thereof.

In the first to third preferred embodiments, the color tracking is realized in regard to contrast and brightness. However, it may be realized in regard to either contrast or brightness.

In the first to third preferred embodiments, contrast and brightness are controlled commonly for the primary color signals R, G and B, and, in the second preferred embodiment, sub-brightness is controlled in accordance with the adjustment of keys, etc. provided in the interior of an apparatus by an inspector, etc. However, handling knobs, etc. may be provided at the exterior of an apparatus to control contrast and/or brightness separately for the primary colors R, G and B. For instance, the color temperature coefficients supplied to the multiplication type digital to analog converter in the brightness control unit may be changed in accordance with a designated value of sub-brightness, and, in the third preferred embodiment, analog multipliers may be further provided to carry out the multiplication of a sub-brightness value between each of the analog multipliers 42R, 42G and 42B and each of the differential amplifiers.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A display apparatus comprising a first input terminal for receiving a first input signal indicative of a primary red color; a second input terminal for receiving a second input signal indicative of a primary green color; a third input terminal for receiving a third input signal indicative of a primary blue color, each of said first, second and third input signals having a primary black level which represents primary brightness information based upon a voltage difference thereof from a reference voltage level; a first output terminal for outputting a first output signal indicative of an output red color; a second output terminal for outputting a second output signal indicative of an output green color; a third output terminal for outputting a third output signal indicative of an output blue color, each of said first, second and third output signals having a controlled black level which represents output brightness information based upon a voltage difference thereof from said reference voltage level; a brightness adjusting unit for generating red, green and blue brightness control information; a control circuit coupled to said brightness adjusting unit and responding to said brightness control information to produce first, second and third brightness control signals for respectively controlling black levels of said first, second and third input signals; a color temperature adjusting unit for generating a red color temperature coefficient, a green color temperature coefficient and a blue color temperature coefficient; means for supplying said red, green and blue color temperature coefficients to said control circuit to cause said control circuit, in response to said color temperature coefficients, to modify said first, second and third brightness control signals, respectively, said control circuit thereby producing a first modified brightness control signal, a second modified brightness control signal and a third modified brightness control signal; and a brightness control unit coupled between said first, second and third input terminals and said first, second and third output terminals, for controlling the respective primary black levels of said first, second and third input signals in response to said first, second and third modified brightness control signals, respectively, to thereby produce said first, second and third output signals having the respective black levels.

2. A display apparatus comprising a first input terminal for receiving a first input signal indicative of a red color; a second input terminal for receiving a second input signal indicative of a green color; a third input terminal for receiving a third input signal indicative of a blue color, each of said first, second and third input signals having a primary voltage amplitude defined by a black level and a white level; a first output terminal for outputting a first output signal indicative of an output red color; a second output terminal for outputting a second output signal indicative of an output green color; a third output terminal for outputting a third output signal indicative of an output blue color, each of said first, second and third output signals having a respective controlled voltage amplitude which represents a contrast among said output red color, said output green color and said output blue color; a contrast adjusting unit for generating red, green and blue contrast control information; a control circuit coupled to said contrast adjusting unit and responding to said contrast control information for producing a first contrast control signal, a second contrast control signal and a third contrast control signal and controlling the voltage amplitudes of said first, second and third input signals, respectively; a color temperature adjusting unit for generating a red color temperature coefficient, a green color temperature coefficient and a blue color temperature; means for supplying said red, green and blue coefficient color temperature coefficients to said control circuit to cause said control circuit to modify said first, second and third contrast control signals in response to said first, second and third color temperature coefficients, respectively, said control circuit thereby producing a first modified contrast control signal, a second modified contrast control signal and a third modified contrast control signal; and a contrast control unit coupled between said first, second and third input terminals and said first, second and third output terminals for controlling the amplitudes of said first, second and third input signals in response to said first, second and third modified contrast control signals, respectively, to thereby produce said first, second and third output signals having the respective controlled voltage amplitudes.

3. A display apparatus comprising a first input terminal for receiving a red color input signal; a second input terminal for receiving a green color input signal; a third input terminal for receiving a blue color input signal, each of said red, green and blue color input signals having a voltage amplitude and a d.c. voltage; a first output terminal for outputting a red color output signal; a second output terminal for outputting a green color output signal; a third output terminal for outputting a blue color output signal, each of said red, green and blue color output signals having a contrast voltage component and a brightness voltage component, a sum of said brightness and contrast voltage components representing a voltage intensity of a respective one of said red, green and blue output signals; a contrast control unit coupled between said first, second and third input terminals and said first, second and third output terminals; a brightness control unit coupled between said first, second and third input terminals and said first, second and third output terminals; a contrast adjusting unit for generating contrast control information; a brightness adjusting unit for generating brightness control information; a first control circuit coupled to said contrast adjusting unit and responding to said contrast control information to produce red, green and blue contrast control information; a second control circuit coupled to said brightness adjusting unit and responding to said brightness control information to produce red, green and blue brightness control information; and a color temperature adjusting unit for producing a red color temperature coefficient, a green color temperature coefficient and a blue color temperature coefficient and supplying said red color, green color and blue color temperature coefficients to said first and second control circuits, said first control circuit responding further to said red color, green color and blue color temperature coefficients to modify said red, green and blue contrast control information, respectively, and produce modified red contrast control information modified green contrast control information and modified blue contrast control information, said second control circuit responding to said red color, green color and blue color temperature coefficients to modify said red, green and blue brightness control information, respectively, and produce modified red brightness control information, modified green brightness control information and modified blue brightness control information; said contrast control unit controlling the voltage amplitude of said red color input signal in response to said modified red contrast control information, the voltage amplitude of said green color input signal in response to said modified green contrast control information and the voltage amplitude of said blue color input signal in response to said modified blue contrast control information, said brightness control unit controlling the d.c. voltage of said red color input signal in response to said modified red brightness control information, the d.c. voltage of said green color input signal in response to said modified green brightness control information and the d.c. voltage of said blue color input signal in response to said modified blue brightness control information, and the respective voltage intensities of said red, green and blue color output signals being thereby produced.

4. The display apparatus according to claim 3, wherein said contrast control unit includes amplifying means coupled to said first, second and third input terminals, for linearly amplifying said red, green and blue color input signals to provide a predetermined contrast thereof.

5. The display apparatus according to claim 4, wherein said brightness control unit includes d.c. voltage shift means coupled to said amplifying means of said contrast control unit for providing said red, green and blue color signals amplified in said amplifying means with predetermined d.c. shift amount to provide a predetermined brightness of said input signals.

6. The display apparatus according to claim 5, wherein said first means includes a contrast adjusting unit coupled to said amplifying means.

7. The display apparatus according to claim 6, wherein said second means includes a brightness adjusting unit coupled to said d.c. voltage shift means.

* * * * *